Figure 1:
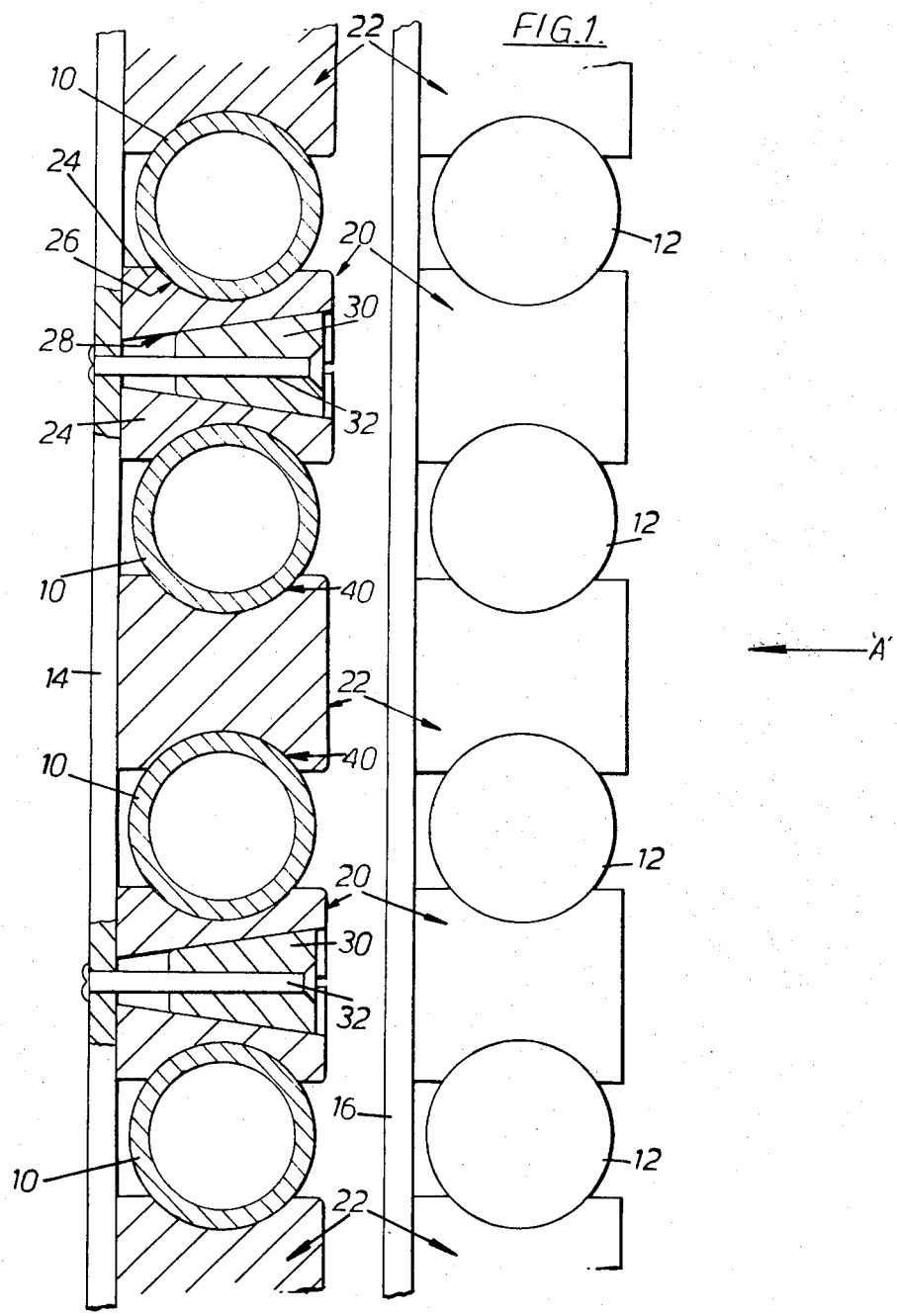

United States Patent [19]

Bennett

[11] 3,924,676
[45] Dec. 9, 1975

[54] HEAT EXCHANGER
[75] Inventor: John Charles Bennett, Ponteland, England
[73] Assignee: Clarke Chapman-John Thompson Limited, Durham, England
[22] Filed: Sept. 20, 1973
[21] Appl. No.: 399,235

[30] Foreign Application Priority Data
Sept. 23, 1972 United Kingdom............... 44099/72

[52] U.S. Cl................ 165/172; 110/98 R; 122/510; 138/106; 248/68 CB
[51] Int. Cl................................................ F28f 9/00
[58] Field of Search........... 165/162, 172; 110/98 R; 122/510; 248/68 R, 68 CB; 138/106

[56] References Cited
UNITED STATES PATENTS

| | | | |
|---|---|---|---|
| 871,838 | 11/1907 | Warwick........................... | 110/98 R |
| 1,663,977 | 3/1928 | Foresman.......................... | 110/98 R |
| 1,716,053 | 6/1929 | Hartmann et al. ................ | 110/98 R |
| 2,889,602 | 6/1959 | Maniaci ............................ | 248/68 R |
| 3,233,852 | 2/1966 | Azar................................. | 248/68 R |
| 3,294,349 | 12/1966 | Mathes............................. | 248/68 R |

FOREIGN PATENTS OR APPLICATIONS

| | | | |
|---|---|---|---|
| 702,176 | 1/1941 | Germany........................ | 248/68 CB |

Primary Examiner—Albert W. Davis, Jr.
Assistant Examiner—Sheldon Richter

[57] ABSTRACT

A heat exchanger is disclosed in which tube passes are suitably secured to a member by means of abutment means provided with faces for receiving portions of the tubes for confinement thereof, wedges forming part of the abutment means serving to maintain said engagement.

5 Claims, 2 Drawing Figures

HEAT EXCHANGER

The present invention relates to a heat exchanger and especially to a supporting structure for tubes, in particular tube passes, within the heat exchanger.

For purpose of disclosure, the tube passes supporting structure will be exemplified as applicable to a heat exchanger in a nuclear reactor plant such as a fast breeder reactor power generation plant where hot liquid metal flows over the tube passes and water flows through the tubes. The invention is useful, however, for supporting and securing tube passes of heat exchangers destined for other uses. For example, the invention may be applied to intermediate heat exchangers for use in liquid metal cooled nuclear plants designed to have the same medium, i.e., liquid metal, flowing over and through the interior of the tubes. The invention is also applicable to a steam power plant other than a nuclear plant. As thus embodied, gas is caused to flow over the tubes while water or steam flows within the tubes.

A heat exchanger which, for example, forms part of a power steam boiler, is made up of numerous tube passes which, depending upon the design and intended use of the heat exchanger, may be arranged in many different ways. The aim of the invention is to provide a simplified supporting structure for the tube passes of a wide variety of heat exchangers to facilitate construction thereof and to ensure trouble-free functioning of the heat exchanger irrespective of the varying operating conditions to which the heat exchangers are subjected.

With the foregoing in mind, we provide in accordance with the invention a heat exchanger in which tube passes are secured to a member extending past several tube passes, abutment means being provided having faces in engagement with said tube passes, at least some of said abutment means being secured to said member, and wedges being provided which maintain said engagement.

Advantageously, the abutment means comprises a two part structure which, in assembled relation, provide outer surfaces in which are formed said faces and inner spaced apart surfaces engaged by said wedges.

Preferably, the inner spaced apart surfaces in assembled relation of the two part structure have a frustoconical shape and the cooperating wedge has an outer surface of complementary frustoconical shape, each wedge being formed with a passage through which a rivet passes for securing the wedge to the elongate member. With the abutment means positioned between two contiguous tube passes, because the outer surface of the wedge means effectively acts as a "cam" surface on the correspondingly shaped inner "cam follower" surfaces of the two part structure, the outer faces on the two part structure will be continuously urged into intimate contact with the contiguous tube passes under varying operating conditions of the heat exchanger.

In the embodiment hereinafter disclosed, it will be seen that not all of the abutment means need be of "floating" self-adjusting construction. Thus, some of the abutment means may fixedly be secured to the elongate member by brazing or welding thereto and may be serially provided in alternation with the abutment means of self-adjusting construction. The fixed abutment means are also provided with opposed tube engaging faces for receiving portions of adjacent tube passes for support therein.

Figure 2:
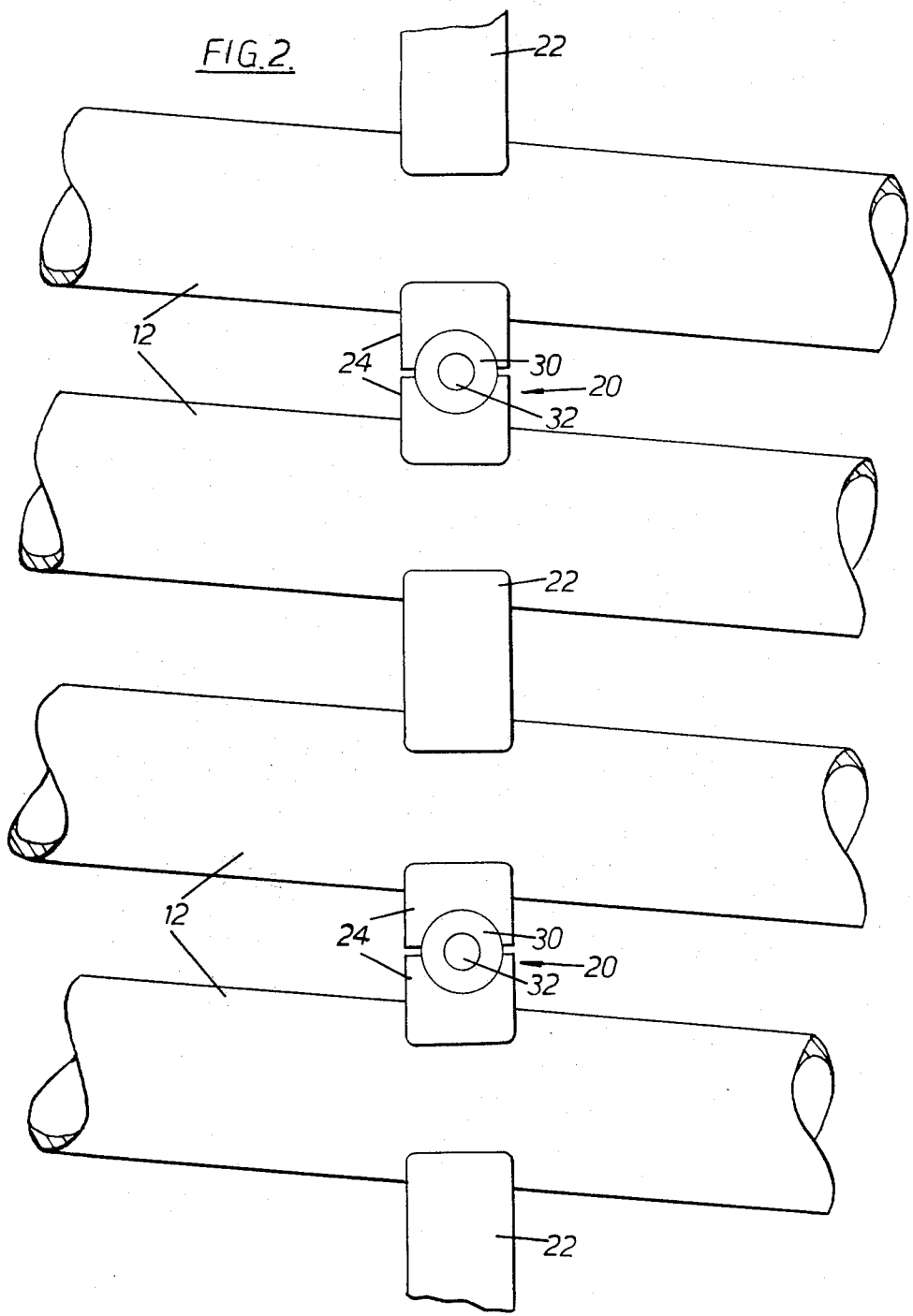

Objects of the invention will be apparent from the following disclosure taken into conjunction with the accompanying drawings, in which:

FIG. 1 is a diagrammatic vertical cross-section through part of the heat exchanger; and FIG. 2 is a view looking in the direction of the arrow A in FIG. 1.

For purpose of disclosure, the heat exchanger shown in the drawing is for use in a nuclear reactor plant such as a fast breeder reactor power generation plant where hot liquid metal flows over the tube passes and water flows through the tubes. While the supporting structure for the tube passes hereinafter described is for nuclear application, it will be apparent to those skilled in the art that the invention is not so limited and has wider application. Furthermore, that part only of the heat exchanger has been illustrated in the drawing which is considered necessary for an understanding of the invention.

The heat exchanger comprises tube passes 10, 12 which may, for example, be turns of two helical tube coils, one disposed within the other in coaxial relation. Elongate members 14, 16 pass adjacent the tube passes 10, 12, respectively, and these tube passes are secured to the members 14, 16 so as to be supported thereby as shown in FIG. 1. Further helical coils, if used, would be nested within or without the helical tube coils. Also, although only one member 14 and 16 is shown in the drawing for tube passes 10 and 12, it is to be understood that several members 14 and 16 are provided for these coils. These members 14, 16 are angularly disposed about the axis of their associated coils and are supported by frame elements of the heat exchanger. The same applies to the members associated with the further coils when used.

The tube passes are secured by means some of which form a first series of abutment means 20 and a second series of abutment means 22. While in FIG. 1, the abutment means 20 and 22 are shown in detail only in relation to the member 14, it is to be understood that the abutment means 20, 22 associated with the member 16 are of similar construction.

As seen in FIG. 1, each abutment means 20 comprises two abutment portions 24, each having in its outer surface a part-circular recess providing a face 26 engageable with tube passes 10 and 12. Since the tube passes 10, 12 in the illustrated embodiment are turns of helical coil they do not cross the members 14, 16 exactly at right angles. Therefore, the recesses providing the faces 26 engageable with the tube passes are slightly angled in the running direction of the tube passes (see FIG. 2).

Each pair of abutment portions 24 in assembled relation as shown in FIG. 1 has a frusto-conical inner surface 28 which converges toward the member 14 or 16 as the case may be. Each abutment means further comprises a frusto-conical wedge 30 formed with a central longitudinal bore through which extends a rivet 32 which also extends through an opening in the associated member 14, 16, such opening being illustrated only with respect to member 14.

The rivet 32 is preferably of a kind known as a "pop" rivet and is designed to secure the wedge and the pair of abutment portions 24, and hence the tube passes to the associated member and to force the abutment portions 24 against their respective tube passes within predetermined limits of a predetermined load.

In the illustrated embodiment, each abutment means of the series 22 is an element in the form of a solid block having two oppositely directed, part-circular spaces 40 engaging respective tube passes 10. The elements 22 are secured to their associated members 14, 16 by brazing or welding or by other suitable means. It will be appreciated that with the construction shown in FIGS. 1 and 2, the tube passes 10, 12 are forced against the respective faces 40 of the elements 22 by the action of the frusto-conical "cam" surfaces of wedges 30 acting on the frusto-conical "cam follower" surfaces 28 of the first series of abutment means 20.

As a modification of the invention, the elements 22 may be replaced by abutment means similar to abutment means 20. Also, if desired, the elements 22 may be mounted for movement longitudinally of the members 14, 16. In that event, fewer abutment means would be used. For example, two or more elements 22 would be used intermediate successive abutment means 20.

The invention is not limited to any particular form of tube array. For example it may be applied to heat exchangers in which the tube passes are planar, being of the so-called platen type, or formed as curved panels, for example panels having involute shape, or where each tube is a U-tube and several U-tubes are nested one in another so that the tube passes lie adjacent one another. Such U-tube assemblies may be planar or curved, for example involute; i.e., each U-tube of the assembly lies within a notional envelope of involute shape.

The tubes 10, 12 for nuclear application may typically be of 9% chromium, 1% molybdenum; or 12% chromium, 1% molybdenum alloy steel or of Alloy 800 type alloy steel. The support components including members 14 and 16 and abutment means 20, 22 may typically be of stainless 316 type stainless steel or other compatible material.

As previously noted, the invention may be applied to heat-exchangers which are designed for the flow of different media over and within the tubes or to heat-exchangers intended to have the same medium both flowing over the tubes and within the tubes. Thus, in addition to heat-exchangers designed to have water or steam flowing through the tubes, the invention is applicable to intermediate heat-exchangers for use in liquid metal cooled nuclear plant which are designed to have liquid metal flowing both over the tubes and within them. The invention is applicable to a steam power plant other than a nuclear plant. For example, the heat-exchanger may be designed to have gas flowing over the tubes and water or steam flowing within them.

While the invention has been described with specific embodiments thereof and in a specific use various modifications thereof will occur to those skilled in the art without departing from the spirit and scope of the invention as set forth in the appended claims.

What I claim is:

1. In combination for securing tube passes to a member extending past several tube passes, abutment means each having two oppositely facing contoured outer faces in securing engagement with and partly surrounding respective adjacent tube passes, at least some of said abutment means each comprising two abutment portions each having one of said contoured faces, and having an inner inclined surface, the inclined surfaces of said two abutment portions lying between said adjacent tube passes and converging towards one another as they approach said member, a wedge shaped and interposed between said two abutment portions in a position to maintain said contoured faces of said abutment portions in securing relationship with said respective adjacent tube passes and to maintain said two abutment portions in engagement with said member, and a securing device engaging said wedge and said member for securing, under a predetermined load, said wedge to said member in said position, others of said abutment means comprising unitary blocks each having said two oppositely facing contoured faces, said unitary blocks being fixedly secured to said member.

2. The combination of claim 1, in which said securing device is a pop rivet and in which said wedge has a passage through which said rivet passes.

3. The combination according to claim 1, wherein said inclined surfaces of said two abutment portions are in engagement with corresponding respective wedge surfaces on said wedge.

4. The combination of claim 1 in which said at least some of said abutment means and said others of said abutment means are alternated between vertically spaced apart tube passes.

5. A heat exchanger in which tube passes are secured to a member extending past several tube passes, abutment means being provided each of which has two oppositely facing contoured faces in securing engagement with and partly surrounding respective adjacent tube passes, at least some of said abutment means each comprising two abutment portions each having one of said contoured faces, and having an inclined surface, the inclined surfaces of said two abutment portions lying between said adjacent tube passes and converging towards one another as they approach said member, said inclined surfaces being in engagement with corresponding respective wedge surfaces on a wedge interposed between said two abutment portions in a position to maintain said contoured faces of said abutment portion in securing relationship with said respective adjacent tube passes and to maintain said two abutment portions in engagement with said member, and a securing device for securing said wedge to said member, in said position, under a predetermined load others of said abutment means comprising unitary blocks each having said two oppositely facing contoured faces, said unitary blocks being fixedly secured to said member.

* * * * *